United States Patent Office 3,830,709
Patented Aug. 20, 1974

3,830,709
METHOD AND CELL FOR SENSING NITROGEN OXIDES
John A. Krueger, Cambridge, Mass. and James W. Ross, Richmond, Va., assignors to Orion Research Incorporated, Cambridge, Mass.
Filed Apr. 9, 1973, Ser. No. 349,392
Int. Cl. G01n 27/46
U.S. Cl. 204—1 T         8 Claims

ABSTRACT OF THE DISCLOSURE

An improved gas-sensing electrochemical cell for measuring nitrogen dioxide dissolved in a sample solution. The cell comprises a potentiometric hydrogen ion-sensitive electrode and a reference or standard electrode, both in contact with an internal standard solution comprising an aqueous acid solution of a nitrite salt. A hydrophobic gas-permeable membrane separates the sample solution from the internal solution.

---

This invention relates to electrochemical detection and measurement, and more particularly to the detention and measurement of gaseous oxides of nitrogen.

Considerable interest exists currently in detecting and measuring oxides of nitrogen, particularly since they are considered to be a serious pollutant by-product of many industries, particularly as combustion product from the burning of gasoline.

Typical prior art methods of measuring concentration of NO and $NO_2$ require isolating a sample and subsequent analysis at a later point in time. Obviously such systems cannot be used for continuous, real-time monitoring. One prior art electrochemical method based on an electrochemical cell showing reversible Nerstian potentials with respect to nitrate ions required that NO and $NO_2$ be oxidized in the gas phase with $O_3$ to $N_2O_5$, and passing the latter together with unreacted $N_2O_4$ through an absorption column for hydrolysis to $NO_3^-$ in a spiked $NaNO_3$ reagent. The nitrate formed was then measured using a nitrate electrode. Obviously, such electrochemical system is not continuous, real-time monitoring.

A principal object of the present invention, therefore, is to provide a novel system for detecting and measuring nitrogen oxides. Other objects of the present invention are to provide a novel electrochemical cell which can be used for continuous measurement of nitrogen peroxide or dioxide concentration or activity; to provide such an electrode which shows substantially reversible Nerstian potentials with respect to nitrogen dioxide concentration; to provide a novel method of detecting and measuring nitrogen dioxide concentration; and to provide such a method which may be used for continuous, real-time monitoring of nitrogen dioxide concentrations.

To effect the foregoing and other objects, the present invention contemplates a novel and improved electrochemical gas-sensing system having a potentiometric hydrogen-ion sensitive electrode and a reference electrode both in contact with an internal standard solution comprising an acid aqueous solution of a nitrite salt. A hydrophobic gas-permeable filter or membrane separates the sample solution from the electrode internal solution.

Other objects of the present invention will in part apper obvious and will in part appear hereinafter. The invention accordingly comprises the apparatus possessing the construction, combination of elements and arrangement of parts and the method constituting the several steps and order thereof for forming the apparatus, all of which are exemplified in the following detailed disclosure and the scope of the application of which will be indicated in the claims.

Figure 1:
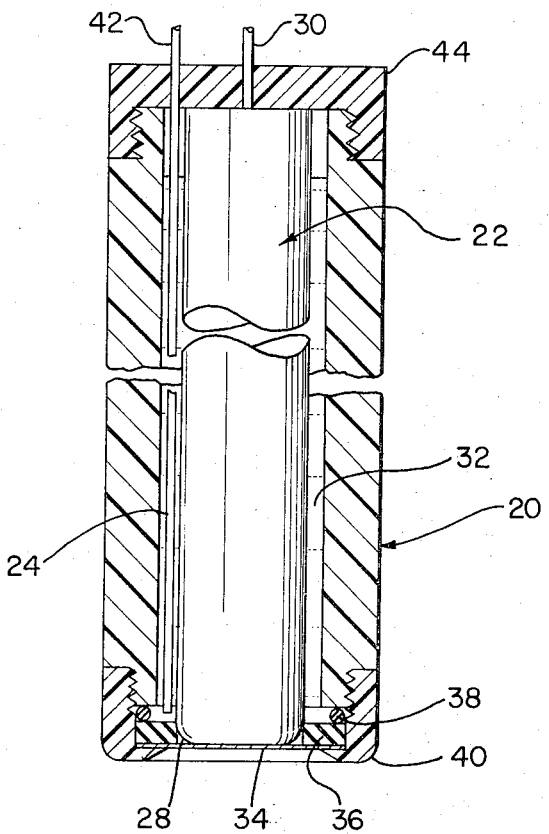
Figure 2:
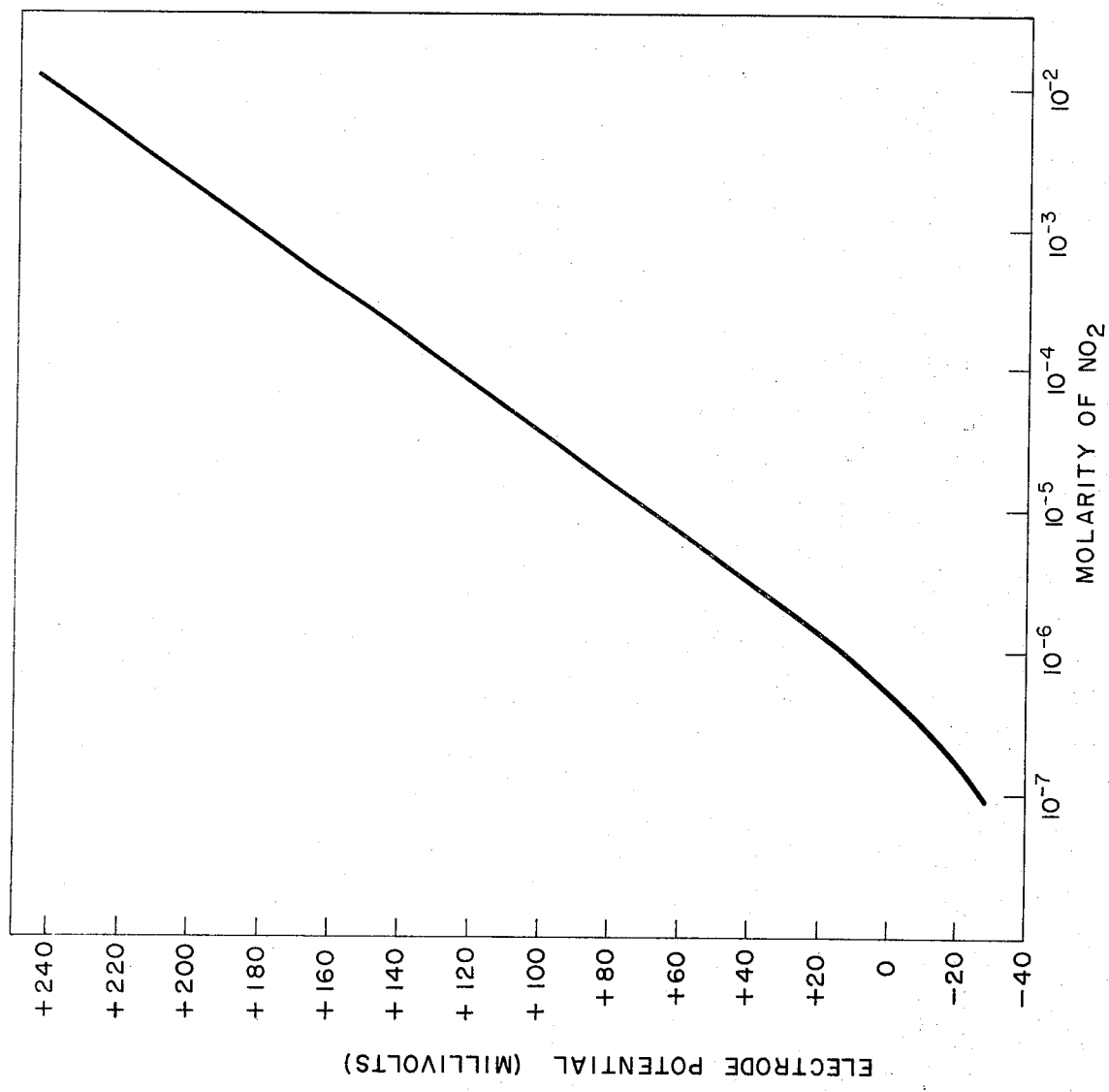

For a fuller understanding of the nature and objects of the invention, reference may be had to the following detailed description taken in connection with the accompanying drawings wherein:

FIG. 1 is a digramatic cross-sectional representation of an exemplary electrode formed according to the principles of the present invention; and FIG. 2 is a graph showing the typical response of an $NO_2$ sensitive cell of the present invention.

Referring now to the drawings, there will be seen in FIG. 1 a specific embodiment of an ion sensitive electrochemical cell 20 embodying the principles of the present invention and comprising pH electrode 22 and reference electrode 24. Cell 20 typically comprises hollow tubular enclosure 26 of an electrically non-conductive material such as polytetrafluorethylene or the like. Depised within the interior of enclosure 26 is electrode 22 which can be any of a number of well-known pH glass electrodes usually formed as a hollow cylinder of a non-conducting glass, closed at one end by a bulb or membrane 28 of a hydrogen-ion sensitive glass. Such pH electrodes also include an internal reference electrode, typically Ag/AgCl (not shown), immersed in a suitable electrolytic filling solution. The internal reference of the pH electrode is connected to external lead 30.

Enclosure 26 is internally dimensioned so that there is a substantial interspace between the external periphery of pH electrode 22 and the interior wall of enclosure 26. Disposed within that interspace is standard solution 32.

Gas-permeable (i.e. at least to nitrogen oxides) membrane 34 is supported about its periphery by one side of spacer ring 36. Membrane 34 is stretched across the other side of spacer ring 36 and thereby held in a predetermined relation to membrane 28. Spacer ring 36 is sealed across an open end of enclosure 26 by elastomeric O-ring 38. Spacer ring 36, O-ring 38 and membrane 34 are all releasably held in their predetermined relation with respect to membrane 28 by cap 40 which is threadedly mounted on enclosure 26. Lastly, a second or reference electrode 24, typically an Ag/AgCl wire, is also disposed in contact with solution 32 to complete the electrochemical cell. Electrode 24 is coupled to external lead 42. The other end of enclosure 26 is preferably closed by cap 44 which also serves as a support for leads 30 and 42.

Membrane 34 is preferably held by cap 40 and spacer ring 36 so that the interspace between the planar surface of pH sensitive membrane 28 and the planar surface of membrane 34 is extremely thin. That interspace communicates with the body of solution 32 but will contain a very thin film, typically less than a mil inch, of solution 32.

Membrane 34 is formed of a microporous hydrophobic material having a porosity sufficiently great so as to readily pass nitrogen oxides gas but not great enough to permit any appreciable passage of liquid or ions. Preferably membrane 34 comprises a thin (typically about 2–10 mil inches thick) flat disc formed of a microporous polytetrafluoroethylene, silicone-treated polyvinyl chloride, and the like, typically having an average pore size in the range of from about 0.4 to 1 micron, preferably about 0.6 microns and an average free area of as much as 80% or more.

Membrane 34 is preferably highly hydrophobic, substantially impermeable to liquid water and dissolved ionic species, and not wetted or corroded even by strong acids. For example, the membrane may be used indefinitely and continuously at a pH even as low as about 0.5.

Standard or reference solution 32 is an aqueous solution of a readily soluble nitrite, such as a salt with a monovalent cation, e.g. sodium, potassium or ammonium, preferably at a level of about $2\times10^{-2}M$; or can use a sparingly soluble salt such as silver nitrite providing a saturated solution at about the same level (e.g. about $1 \times 10^{-2}$M to obtain a more stable cell. The presence of the Ag/AgCl reference electrode requires that electrolyte 32 include a level of chloride which is fixed (e.g. at $1 \times 10^{-3}$M) at a value selected only for convenience.

Using this electrolyte in a cell of the type described above, it has now been found that potentials will develop upon diffusion of gases such as $CO_2$, $SO_2$ and $Cl_2$ through membrane 34 due to the formation of the corresponding acid in electrolyte from the gas introduced.

That part of this problem caused by $CO_2$ is not terribly important inasmuch as when internal electrolyte 32 of the cell is measuring $NO_2$, the cell shows a preference for $NO_2$ over $CO_2$ by several orders of magnitude.

In order to avoid $SO_2$ interferences, it is preferred to treat the sample solution by adding thereto a salt which will ionize to yield $Cr_2O_7^=$. The latter ion serves as an oxidizing agent which preferentially oxidizes $SO_2$ (hence immobilizing the gas as $H_2SO_4$) but will not oxidize $NO_2$. Additionally, the pH of the sample solution should be adjusted to be less than about 5.5 but preferably at 3.5 or less. By acidifying the solution, the vapor pressure of $NO_2$ and $NO$ above the latter is maximized.

The operation of the $NO_2$ sensing electrochemical cell of the present invention is of course based on a potentiometric measurement of the change of pH of electrolyte 32 caused by diffusion of $N_2O$ and $NO$ through membrane 34. These gases will diffuse into and out of standard solution or electrolyte 32 until the partial vapor pressure thereof on both sides of membrane 34 is equal. Nitrogen oxides exhibit approximately the following, general relationship (no attempt being made here to balance the relationship stoichiometrically)

$$N_2O_5 \rightarrow N_2O_4 \rightleftharpoons NO_2 \rightleftharpoons NO$$

The reaction from left to right is generally simply dependent upon increasing temperature and from right to left is generally an oxidation reaction requiring oxygen. The equilibrium at room temperature favors the formation of $NO_2$ which is the most stable at that temperature.

Thus, in electrolyte 32, it is believed that one finds a member of equilibria:

(1) $\quad 2HNO_2 \rightleftharpoons NO_2 + NO + H_2O$ (2) $\quad HNO_2 \rightleftharpoons H^+ + NO_2^-$ where (3) 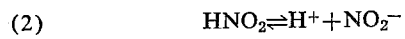
$$\frac{[NO_2^-][H^+]}{[HNO_2]} = K$$

K being the dissociation constant.

(4) 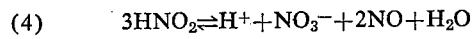 $\quad 3HNO_2 \rightleftharpoons H^+ + NO_3^- + 2NO + H_2O$

The hydrogen ion concentrations of these equilibria are believed measured by pH electrode 22 which is in contact with solution 32. The potential at electrode 22 will vary with any change in the hydrogen ion concentration in solution 32 according to the well known Nernstian equation. Inasmuch as the hydrogen ion concentration will change if the equilibrium is disturbed by a change in the vapor pressure of the $NO_2$ and NO above the sample solution, the potential across electrodes 22 and 24 is then indicative of the concentration of the nitrogen oxides outside membrane 34.

By simply calibrating the cell of the invention by known techniques, the nitrogen oxide concentration can be read directly on a known high input impedance device connected across the pH and reference electrodes.

Ionic species normally cannot cross the gas-permeable membrane and, therefore, will not affect electrode operation.

An illustrative method of use of this electrode will now be described.

An electrochemical cell according to the invention was made using a pH sensitive electrode (Orion Research Incorporated Model 91-01) of the glass membrane type as the primary electrode and an Ag/AgCl as a reference electrode. The internal reference solution of the cell was an aqueous solution of $2 \times 10^{-2}$ M $NaNO_2$ and $1 \times 10^{-3}$ M NaCl. The cell membrane was a polytetrafluorethylene porous sheet as heretofore described.

The sample solution was prepared by first providing an an aqueous solution of $2 \times 10^{-2}$M $NaNO_2$ and $1 \times 10^{-3}$M $Na_2Cr_2O_7$ all at a pH of 3.0. The cell was immersed in 100 ml. of this sample solution with the membrane contacting the latter. One ml. of an aqueous solution of $1 \times 10^{-5}$M $NaNO_2$ was added to the sample solution and the cell potential read. Subsequent additives of appropriate amounts of $NaNO_2$ solutions, each differing by a decade in molarity were made at spaced intervals. It will be appreciatetd that upon addition of the $NaNO_2$ solutions to the acid sample, the $NaNO_2$ decomposed to release free $NO_2$ and NO. The response of the cell in millivolts to the various concentrations of $NaNO_2$ solution is shown in FIG. 2.

Since certain changes may be made in the above apparatus and method without departing from the scope of the invention herein involved, it is intended that all matter contained in the above description or shown in the accompanying drawing shall be interpreted in an illustrative and not in a limiting sense.

What is claimed is:

1. An improved gas-sensing electrochemical cell for measuring the nitrogen oxides content of a sample, said cell including
   a potentiometric hydrogen ion-sensitive electrode and a reference electrode both in contact with an electrolyte;
   and a membrane permeable to the gaseous oxides of nitrogen arranged to separate said electrolyte and electrodes from said sample such that the passage of nitrogen oxides through said membrane between said electrolyte and sample will alter the hydrogen ion activity of said electrolyte,
   said electrolyte comprising an acid aqueous solution of a nitrite salt.

2. The electrochemical cell as defined in claim 1 wherein said salt is readily soluble in aqueous solutions.

3. The electrochemical cell is defined in claim 1 wherein said salt is ammonium, potassium or sodium nitrite.

4. An electrochemical cell as defined in claim 1 wherein said reference electrode is an Ag/AgCl electrode.

5. An electrochemical cell as defined in claim 1 wherein said hydrogen ion-sensitive electrode includes as the ion-sensitive portion thereof a pH responsive glass membrane.

6. The method of determining nitrogen oxides content of a sample solution, said method comprising;
   providing a potentiometric hydrogen ion-sensitive electrode, a reference electrode, an electrolytic solution in contact with said electrodes and having a nitrite salt dissolved therein, and a membrane permeable to the gaseous oxides of nitrogen and for separating said electrodes and said electrolyte on one side of said membrane from a sample solution on the other side of said membrane;
   contacting said sample solution with said other side of the membrane to diffuse nitrogen oxides through said membrane; and
   measuring the electrical potential developed between said electrodes as an indication of the nitrogen oxides content of said sample solution.

7. The method as defined in claim 6 wherein sufficient quantity of $Cr_2O_7^=$ ions is added to said sample solution to substantially eliminate the presence of any free $SO_2$ in said sample solution.

8. The method as defined in claim 7 including establishing the pH of said sample solution at a value less than about 3.5.

References Cited

UNITED STATES PATENTS

| | | | |
|---|---|---|---|
| 3,756,923 | 9/1973 | Dahms | 204—195 P |
| 3,649,505 | 3/1972 | Strickler et al. | 204—195 P |
| 3,673,069 | 6/1972 | Niedrach et al. | 204—195 P |
| 3,763,025 | 10/1973 | Chand | 204—1 T |
| 3,357,908 | 12/1967 | Riseman et al. | 204—195 P |
| 3,236,759 | 2/1966 | Robinson | 204—195 R |

TA-HSUNG TUNG, Primary Examiner

U.S. Cl. X.R.

204—195 P, 195 M